April 4, 1967 J. A. VAN HORN ETAL Re. 26,187

ELECTRIC WATCH

Original Filed Feb. 12, 1954 6 Sheets-Sheet 1

INVENTORS

JOHN A. VAN HORN
PHILIP E. BIEMILLER
JAMES H. REESE

BY

M. V. Gould

ATTORNEY

ELECTRIC WATCH

Original Filed Feb. 12, 1954 6 Sheets-Sheet 2

INVENTORS
JOHN A. VAN HORN
PHILIP E. BIEMILLER
JAMES H. REESE

BY M. V. Gould
ATTORNEY

ELECTRIC WATCH

Original Filed Feb. 12, 1954 6 Sheets-Sheet 3

INVENTORS
JOHN A. VAN HORN
PHILIP E. BIEMILLER
JAMES H. REESE
BY
ATTORNEY

ELECTRIC WATCH
Original Filed Feb. 12, 1954 6 Sheets-Sheet 4
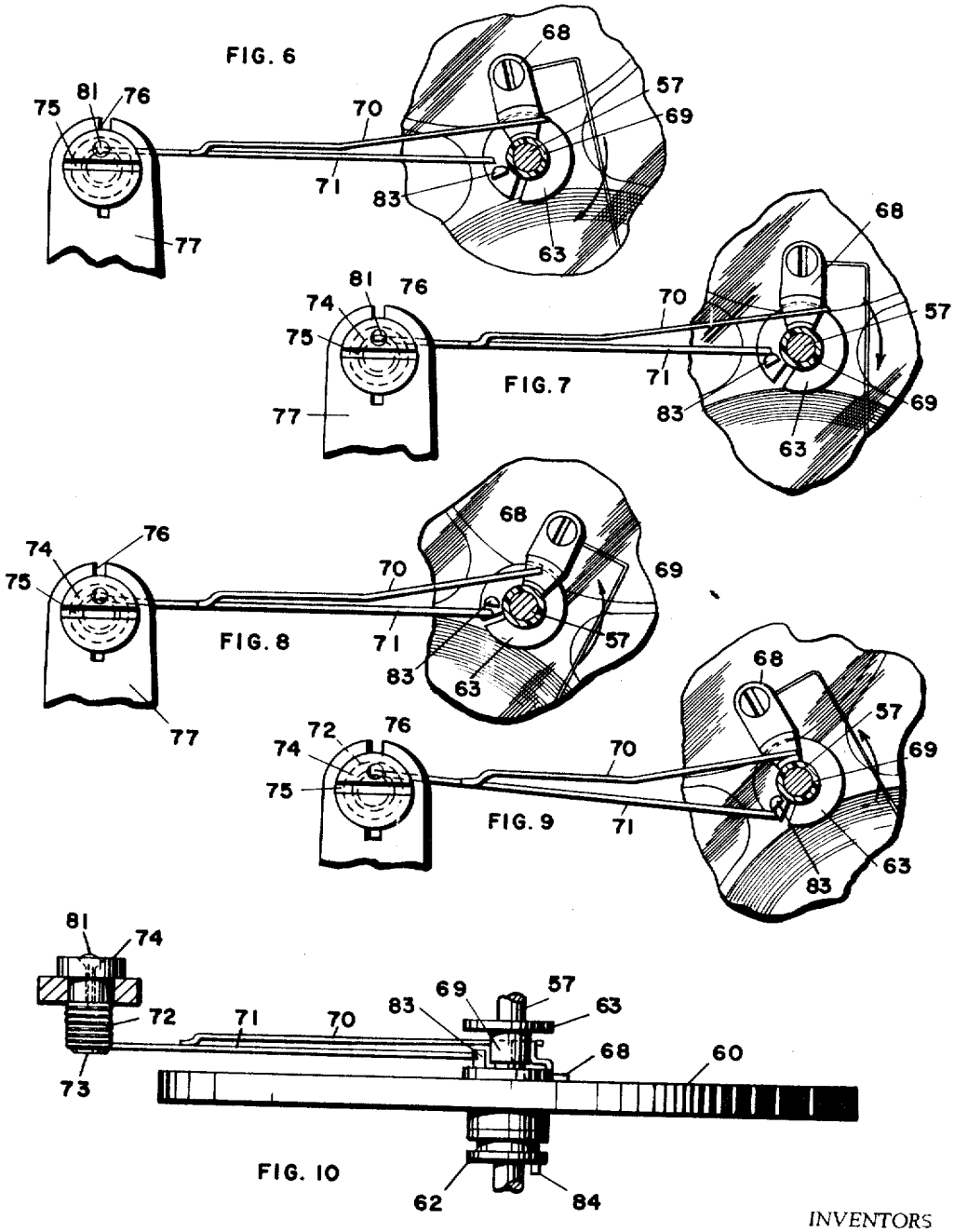
INVENTORS
JOHN A. VAN HORN
PHILIP E. BIEMILLER
JAMES H. REESE
BY
M. V. Gould
ATTORNEY

ELECTRIC WATCH

Original Filed Feb. 12, 1954 6 Sheets-Sheet 5

INVENTORS
JOHN A. VAN HORN
PHILIP E. BIEMILLER
JAMES H. REESE
BY
M. V. Gould
ATTORNEY

ELECTRIC WATCH

Original Filed Feb. 12, 1954 6 Sheets-Sheet 6

INVENTORS
JOHN A. VAN HORN
PHILIP E. BIEMILLER
JAMES H. REESE

BY Mm. Gould
ATTORNEY

United States Patent Office

Re. 26,187
Reissued Apr. 4, 1967

26,187
ELECTRIC WATCH

John A. Van Horn and Philip E. Biemiller, both of Lancaster, Pa., and James H. Reese, Manheim, Pa., by Hamilton Watch Company, Lancaster, Pa., a corporation of Pennsylvania, assignee Original No. 2,888,797, dated June 2, 1959, Ser. No. 409,934, Feb. 12, 1954. Application for reissue Aug. 10, 1966, Ser. No. 579,444
8 Claims. (Cl. 58—28)

Matter enclosed in heavy brackets [ ] appears in the original patent but forms no part of this reissue specification; matter printed in italics indicates the additions made by reissue.

The invention relates to a wrist watch of small size in which the motive power is a battery contained within the watch case and in which a moving coil passing through a magnetic field is energized periodically by the battery to provide the power mechanism for the watch.

Heretofore, in attempts to make battery operated wrist watches, the problem of obtaining sufficient energy to operate the watch for extended periods from a source which could be enclosed in a wrist watch case along with the movement was insurmountable, and the maintaining of a clean and smooth contact provided difficulties which could not be overcome in a practical manner.

The object of the present invention is to provide a wrist watch which may be operated by the power furnished from a battery small enough to be enclosed within the wrist watch case by attaining a sufficiently high electrical efficiency.

It is a further object of the present invention to provide a battery operated wrist watch in which the electrical circuitry is of such a nature that the voltages developed are comparatively small, and in particular circuitry of sufficiently low inductance that electrical erosion of the contacts when the circuit is broken is negligibly small.

A further object of the present invention is to make use of the field from a permanent magnet and to pass through that field a coil, and to provide means for energizing said coil during its passage through the field to obtain an impulse which is imparted to the coil through a predetermined angle in its oscillatory movement in one direction and to provide a hairspring for supplying a restoring torque resulting in an oscillatory movement of said coil.

It is a further object of the present invention to provide means for making an electrical circuit between the oscillating coil and the stationary battery and to provide an oscillating contact which will have a wiping engagement through a portion of its angular movement to insure a clean and smooth contact.

It is a further object of the present invention to provide a means in combination with the battery powered oscillating balance wheel for taking the oscillatory motion from the balance wheel and changing it to intermittent rotary motion in one direction and to do so with small expenditure of energy.

It is a further object of the present invention to provide an oscillating balance wheel and hairspring assembly, which balance wheel carries a coil which is periodically energized by a battery contained within the wrist watch case and to oscillate said coil through a magnetic field created by permanent magnets, energizing the coil through contacts, one of which oscillates with said coil and engages the other contact through an angular distance not greater than the angular distance the coil moves in passing through an intense portion of the magnetic field, and through a pair of intermeshed wheels to transfer the oscillatory movement of the balance wheel into intermittent rotary motion in one direction and to further measure the extent of that intermittent rotary motion by hands with a watch dial.

It is a still further object of the present invention to provide permanent magnets and to bridge said magnets with a shunt spaced from the magnets to provide intensified magnetic fields and to oscillate a coil between the shunt and the permanent magnets, passing the coil through an intense portion of the magnetic fields between the shunt and the pair of magnets.

It is a still further object of the present invention to provide a contact making mechanism which will make contact, on movement of the coil in one direction, with a predetermined pressure and through a predetermined angular distance and will swing clear of such contact upon oscillatory movement in the other direction, with only slight resistance to the movement of said contacts necessary to swing it from engagement with the oscillating contact.

It is a still further object of the present invention to provide a pair of intermeshed indexing gears used in combination with the oscillatory movement of the balance wheel, the teeth of which gears are adapted to be engaged by a jewel pin carried by the balance staff for a movement of the gears of one half tooth's distance, each of the gears moving in an opposite direction with means for taking from one of the gears intermittent motion in a single direction.

These and further objects and advantages of the invention will become more apparent upon reference to the following specification and claims and appended drawings in which:

FIGURES 6, 7, 8, and 9 show different positions of the contact making mechanism.

FIGURE 10 is a side elevation of the balance wheel and contact spring together with the indexing pin.

Figure 11:
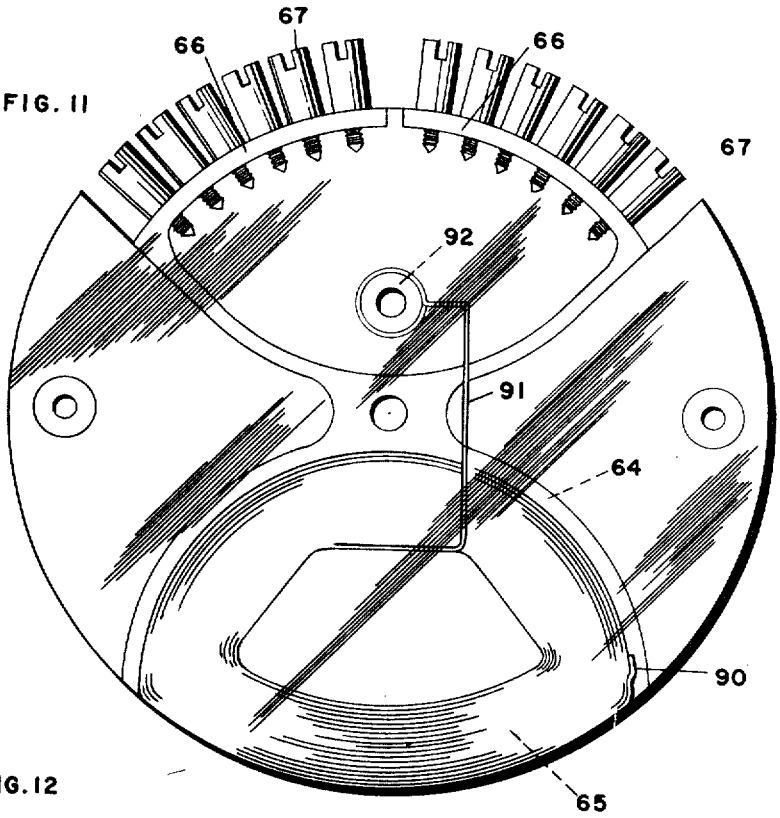

FIGURE 11 is a top plan view of the balance wheel.

Figure 2:
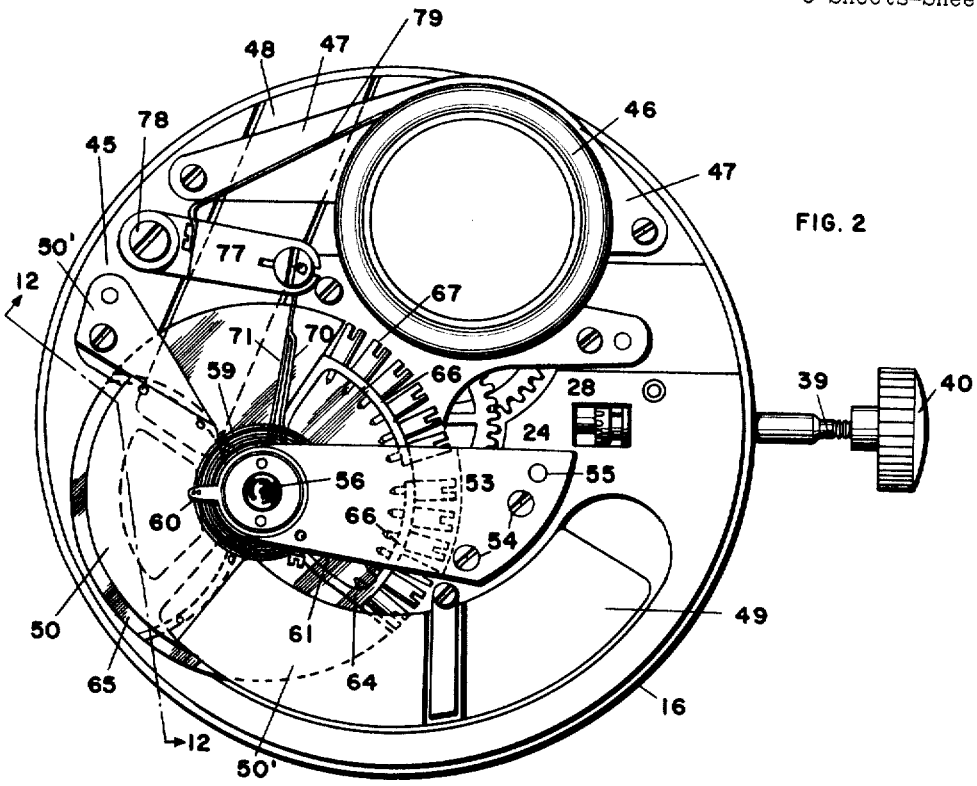
FIGURE 2 is a bottom plan view of the watch with the back removed showing the balance wheel contact and battery assembly.
Figure 1:
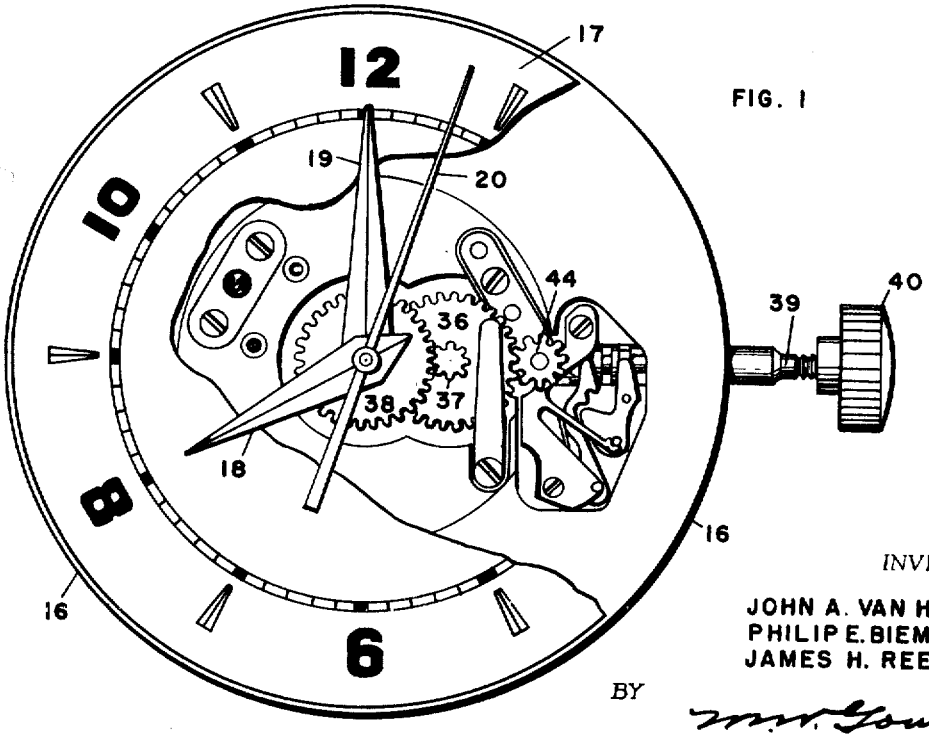
FIGURE 1 is a top plan view of the wrist watch with the dial broken away to show the setting mechanism.
Figure 3:
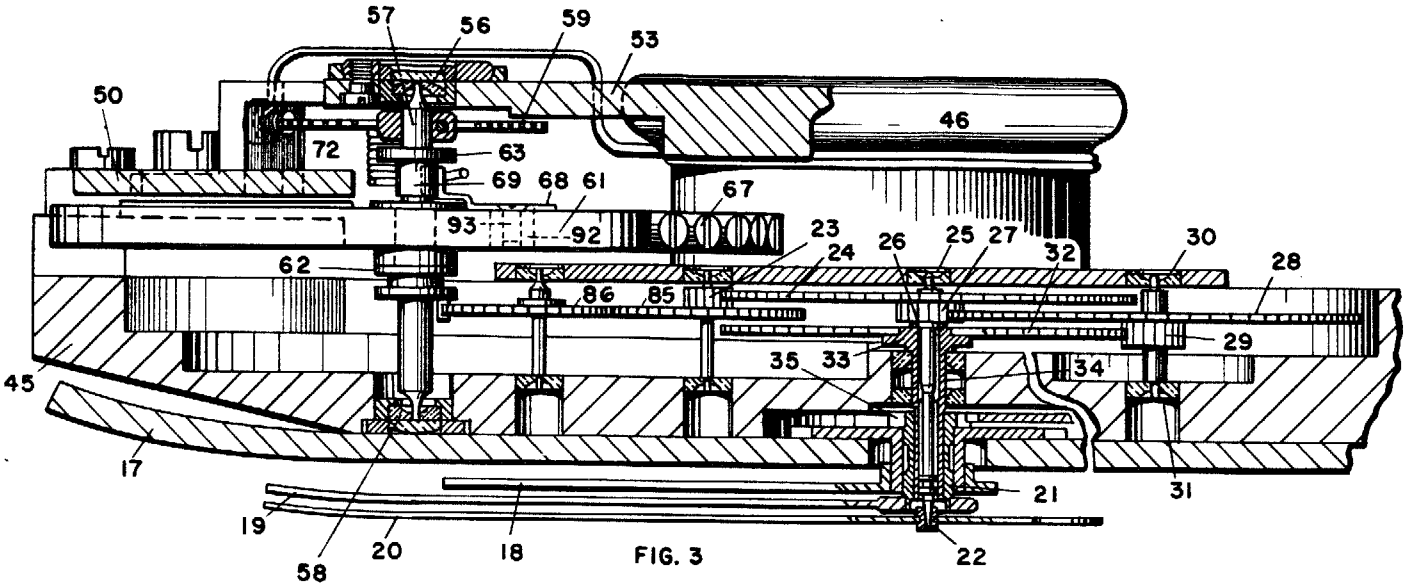
FIGURE 3 is a sectional view in two parts taken on a line of centers which shows in an extended line the balance wheel and indexing mechanism together with the train and hands and the setting mechanism.
Figure 3A:
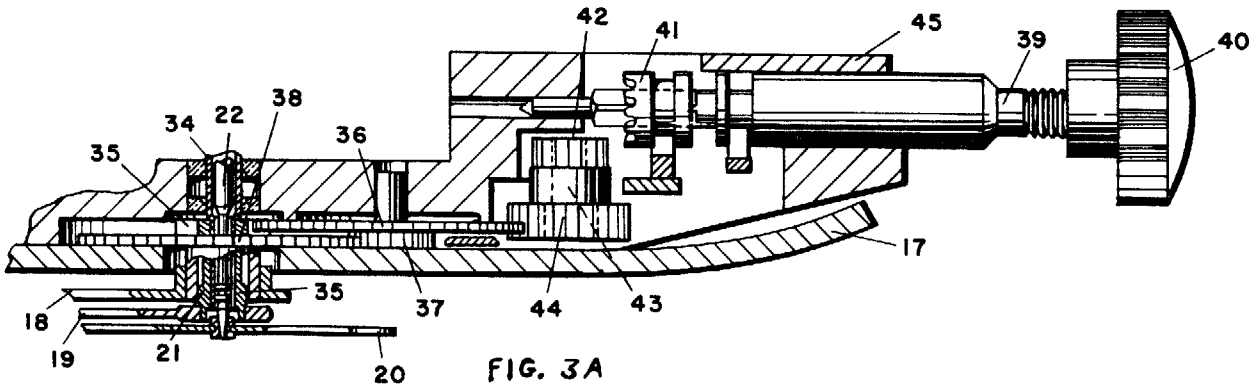
FIGURE 3A is a continuation of FIGURE 3 showing the setting mechanism for the watch.
Figure 12:
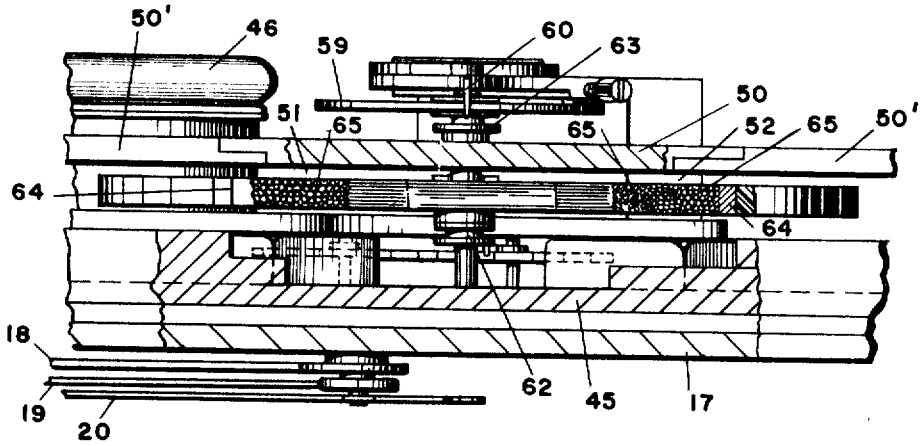

FIGURE 12 is a sectional view on line 12—12 of FIGURE 2.

Figure 13:
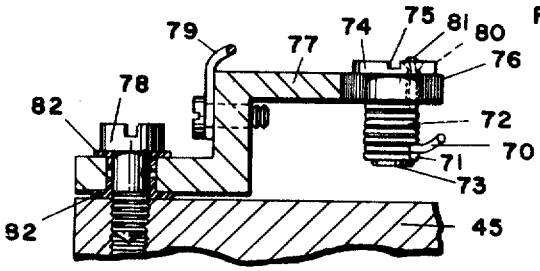

FIGURE 13 is a section of the contact supporting bridge.

Figure 14:
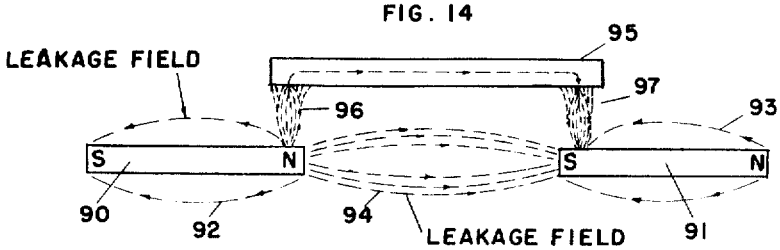

FIGURE 14 is a diagrammatic view of the permanent magnetic field, showing the flow of magnetic flux.

Figure 15:
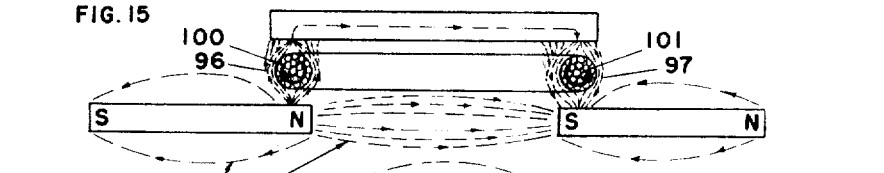

FIGURE 15 is a diagrammatic view of FIGURE 14 including the coil.

Figure 16:
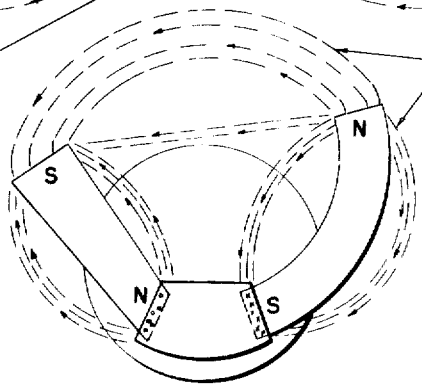

FIGURE 16 is an actual view of the magnets and shunt diagrammatically showing the magnetic field.

Figure 17:
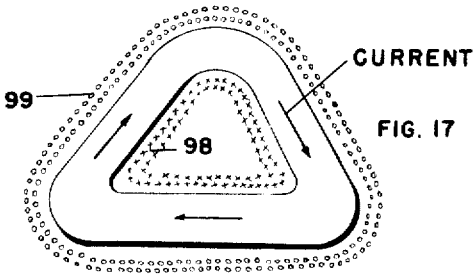

FIGURE 17 is a top plan view of the coil showing the direction of flow of the magnetic flux during the energization of the coil.

Referring to the figures, a wrist watch case 16 encloses a dial 17 with hour hand 18, minute hand 19 and sweep second hand 20. The minute hand is mounted on the cannon pinion 21 which is hollow and has a central shaft 22 journalled therein to drive the sweep second hand 20. A train of gears and pinions receives the motion from the index pinion 23. A first gear 24 journalled in an upper jewel 25 and supported by a lower bearing 26 meshes with the index pinion 23 and carries first pinion 27 which is in mesh with the second gear 28 which carries a second pinion 29 and is journalled in the upper bearing 30 and lower bearing 31. The gear 24 is journalled on the shaft 22 carrying the second hand 20. A third gear 32 is in mesh with the pinion 29 and the relation between the gear 24 and the gear 32 is such that the gear 24 turns sixty times as fast as the gear 32. The gear is staked to a hub 33 which is extended to form a sleeve 34 which carries a cannon pinion 35. The cannon pinion 35 carries the minute hand 19 and also drives a gear 36 and its pinion 37, which in turn drives the gear 38 carrying the hour hand 18.

A stem 39 having a crown 40 and a tooth gear 41 may be moved into and out of engagement with the gear 42 mounted on the shaft 43 and turning gear 44 which is in mesh with the gear 36. By turning the crown 40 with the stem 39 pulled out so that the gear 41 is in mesh with the gear 42, the hands may be set to any desired position through the usual watch setting mechanism.

The watch case 16 has a pillar plate 45 which may be cut out to receive a battery 46. The battery 46 has a bottom plate 47 by means of which the battery is grounded to the pillar plate 45 and connected parts of the watch. The pillar plate is cut away to receive a straight permanent magnet 48 and a curved permanent magnet 49 which are held in place by screws ( not shown). These magnets have their ends bridged by a shunt 50 supported on non-magnetic bridges 50', secured to the pillar plate 45 to provide a pair of intensified magnetic fields 51 and 52 (FIGURE 12).

A balance cock 53 mounted on the pillar plate by a pair of screws 54 and a steady pin 55 supports an endstone and olived jewel assembly 56 in which is journalled one end of a balance staff 57. The other end is journalled in a like assembly 58 mounted in the pillar plate 45. The balance staff carries the usual hairspring 59 controlled by the usual regulating pins 60 and a balance wheel assembly 61 having an indexing roller 62 and a contact roller 63.

The balance wheel is formed with a substantially 8-shaped metal body 64 which supports between one pair of its arms an electric coil 65, while the other pair of arms have their ends 66 extended inward to support counter-balancing screws 67. The coil 65 has one end 90 grounded by connection to the 8-shaped metallic body of the balance wheel. The coil 65 together with portions of the framework 64 is embedded in a protective plastic resin. The plastic resin allows the insertion of weights 102 embedded in the plastic which may be used for counterbalancing. The other end 91 is connected to a nut 92 (FIGURE 11) embedded in plastic casting. A screw 93 threaded into nut 92 makes electrical connection with a contact strip 68 which is supported by an insulated sleeve 69 carried on the contact roller 63. This contact 68 oscillates with the balance wheel and is periodically brought into engagement with a spring contact arm 70 secured to the extended end 71 of a coil spring 72 by brazing, welding, soldering, or any suitable means.

The spring 72 is carried on a pin 73 having an enlarged head 74 which has a kerf 75 so that the pin and its supported spring may be oriented to any desired angular position. The pin is carried by friction in the split end 76 of a bridge 77 which is held to the pillar plate by screw 78 and is connected to the battery through the wire 79. The end of the wire spring is extended upward through a hole 80 in the pin 74 and soldered at 81 to provide electrical connection. The bridge 77 is insulated from the pillar plate and screw 78 by a pair of insulating washers 82.

Referring particularly to FIGURES 6, 7, 8, 9, 10 and 11, the contact 68 which is connected to one end of the coil is oscillated by the motion of the balance assembly 61.

Carried by the contact roller 63 is a non-conducting jewel pin 83 which is adapted to contact the end portion of the extended end 71 of the spring 72 during the oscillating motion of the balance assembly 61. Referring particularly to FIGURE 6 where motion is in a clockwise direction, the end of the spring wire 71 is free of contact with the pin 83 and at the same time the contact making arm 70 is free of the contact of the contact strip 68. FIGURE 7 shows continued motion in a clockwise direction with the pin 83 engaging the extended end 71 of the spring 72 flexing the entire length of the extended end 71 and slightly opening the coils of the spring 72 so that the flexing motion caused by contact of the pin when moving in a clockwise direction utilizes a very small amount of energy by reason of the ease with which the arm 71 is flexed due to the comparatively long length of wire and its connection with the coils of the spring.

Referring to FIGURE 8 where motion is in a counterclockwise direction, the pin 83 is about to engage the extended spring wire 71, the contact arm 70 being free of contact with the contact strip 68. FIGURE 9 shows the engagement between the pin 83 and the arm 71 bringing the contact arm 70 into wiping engagement with the contact strip 68, the contact being maintained until the end of the wire 71 is freed from the pin 83 by reason of the relative motion. The angular interval over which electrical contact is established can be altered by moving the pair of wires 70 and 71 either along their length or at right angles to this direction in the plane perpendicular to the axis of rotation of the staff 57 by rotation of the bridge 77 about the screw 78 or by rotation of the wires about the pin 74 or by bending the wires 70 and 71 and altering the angle between them in the plane perpendicular to the axis of the staff 57. The same manipulations can be used to alter the pressure of the contact between the wire 70 and the contact strip 68, and it has been found in practice that a proper combination of these manipulations provides a range of variation of contact duration and of contact pressure which exceed those actually necessary. The contact pressure is also dependent upon the resilience of the wires 70 and 71 which provides an additional adjustment.

The proper value of contact pressure is one which is great enough to insure good electrical contact, but not so great as to provide excessive interference with the motion of the balance wheel. The angular interval of contact should be chosen so as to provide the desired amplitude of oscillation of the balance wheel, and the angular interval of contact is limited in its usable upper value by the spatial extent of the intensified magnetic fields 51 and 52.

Figure 4:
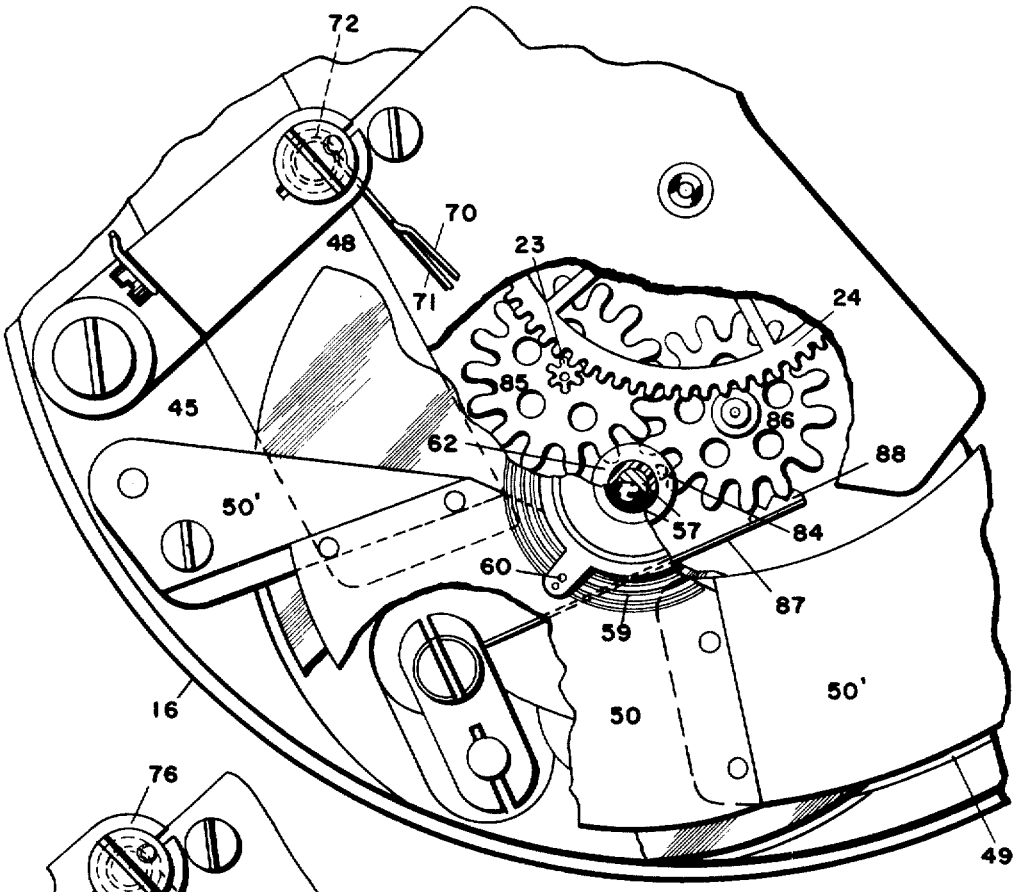
FIGURE 4 is a partial bottom view showing the details of the indexing mechanism.
Figure 5:
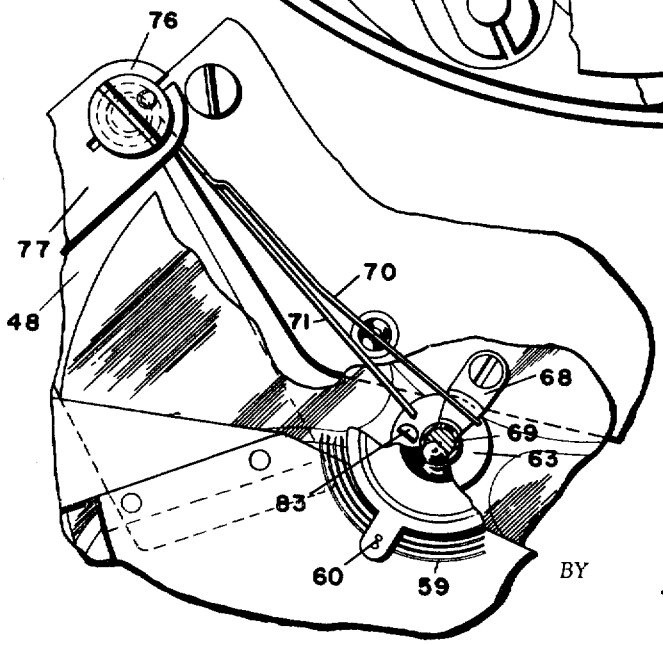
FIGURE 5 is a detail of the contact making mechanism.

Referring particularly to FIGURE 4, the lower or indexing roller 62 carries an indexing pin 84 which oscillates with the balance wheel and balance staff. Located in the path of oscillatory movement of the indexing pin 84 are a pair of meshed indexing wheels 85 and 86. Arranged at the outer circumference of one of the wheels and contacting the extreme ends of the teeth is a detent spring 87 having a serrated detent stone 88, the extreme edges of which are rounded to prevent wear on the teeth. The detent spring 87 is made long and flexible but has sufficient strength to position either of the indexing wheels at half tooth intervals. The indexing wheels 85 and 86 are located to bring their teeth into the path of movement of the oscillating pin 84, the positioning by the detent being such that the pin 84 engages a tooth of one wheel when moving in one direction thereby moving each of the wheels a half a tooth so that the pin will clear the teeth of that wheel and engage a tooth of the second wheel on its return swing again moving both wheels the distance of half a tooth, thereby providing intermittent rotary motion in either direction depending on which wheel the pinion 23 is attached. The present drawing shows the pinion 23 attached to the wheel 85 giving motion in a clockwise direction (FIGURE 4) to the pinion 23.

In use, the electric watch functions by reason of a periodic impulse delivered as close as possible to the point of rest of the balanced wheel by passing an electric current through a coil while said coil is moving through a magnetic field of a particular direction set up by a pair of permanent magnets which may be made of Alnico V and a bridging shunt. The angle of balance motion through which electrical energy is transformed into mechanical energy with a usable efficiency is limited by the angular distance the coil moves when passing through the intensified magnetic field.

Referring to the diagrammatic showings in FIGURES 14–17, the *permanent magnets 90 and 91 corresponding to the* permanent magnets 48 and 49 of FIGURE 2 are positioned so that a north pole is opposed to a south pole and present leakage fields 92 and 93 respectively to magnets 48 and 49 and a field 94 common to both magnets. The *shunt 95, which corresponds to the* shunt 50 *of FIGURE 2* is positioned to bridge the gap between the two magnets and serves to intensify the flow of magnetic flux from the north pole of magnet 48 to the south pole of magnet 49 providing the two intensified regions 96 and 97 through which the coil passes. At the moment of energization of the coil a magnetic field is produced, as shown in FIGURE 17, in which the cross marks 98 indicate a direction of magnetic flux into the paper and the dots 99 indicate a direction out from the paper. This directional flow of magnetic flux is indicated by the arrows 100 in FIGURE 15 in the field 96 and in the direction of the arrows 101 in the field 97. By examining FIGURE 15 it will be seen that the flow of magnetic flux in the permanent magnetic field adds vectorially to the flow of the flux produced in the coil on the left edges of the coil, as shown in FIGURE 15, and subtracts on the right edges of the coil. This will produce a force tending to move the coil toward the right (FIGURE 15), the force acting simultaneously at two places on the coil and in the same *angular* direction. *Vectorially of course the forces act perpendicular to the substantially radial coil portions in regions 96 and 97 in first and second directions respectively which directions because of the eccentric mounting of the coil, differ by some angle other than 180°.*

The battery 46 through its ground 47 pasing through the pillar plate and balance cock and hairspring to the balance staff and to one end of the coil delivers an electric current upon the completion of the circuit through the other end of the coil, the contact 68, the contact making arm 70, the spring 72, the bridge 77, and the return wire to the battery 79. The energization of the coil in the interval it is passing through the magnetic fields between the ends of the magnets 48 and 49 and the shunt 50 imparts energy to the balance wheel 61 which in turn imparts rotary motion through the pin 84 to the indexing wheels 85 and 86, through the train of gears to the customary hands.

The energy thus imparted to the balance wheel once in each complete cycle restores the energy expended by the wheel to overcome frictional losses, windage losses and spring losses, as in the usual watch balance, and also the energy expended by the wheel in making electrical contact and in driving the train, in which features and especially in the last, the action is not the same as in the ordinary spring driven watch. A motion is established at which equilibrium is maintained between the energy expended and the energy supplied, and the balance wheel and hairspring combination act in the ordinary fashion, with the equilibrium energy changing its form from kinetic energy of the wheel to potential energy in the spring and back again according to well defined laws with the result that the oscillations are performed in equal times and the hands move with uniform velocity.

The invention may be embodied in other specific forms without departing from the spirit or essential characteristics thereof. The present embodiment is therefore to be considered in all respects as illustrative and not resrictive, the scope of the invention being indicated by the appended claims rather than by the foregoing description, and all changes which come within the meaning and range of equivalency of the claims are therefore intended to be embraced therein.

What is claimed is:

1. In a battery operated watch, a balance wheel and staff assembly, means establishing a permanent magnetic field having two spaced intensified regions, a substantially planar coil carried by said assembly and arranged to have separate parts thereof simultaneously pass through said intensified regions, the plane of said coil being substantially perpendicular to said staff, and means for periodically connecting said coil with *the watch* battery to create a magnetic flux about said coil, said intensified regions being so arranged that the reaction between said flux and *the magnetic field in* said intensified regions simultaneously impulses said coil in each intensified region, the impulse in one region urging the portion of the coil therein in a first direction while said impulse in the other region urges the portion of the coil therein in a second direction which differs from said first direction by some angle other than 180°.

[2. In a battery operated electric watch, a balance wheel and staff assembly, a coil wound about an axis normal to said balance wheel carried by said assembly, means establishing a permanent magnetic field having two intensified regions arranged to simultaneously pass through spaced portions of said coil, and means for periodically connecting said coil with said battery, said coil being mounted for oscillation through said magnetic field.]

[3. In a battery operated electric watch, a balance wheel and staff assembly, a coil carried by said balance wheel in an angular sector thereof encompassing less than 180°, means establishing a permanent magnetic field having two intensified regions so located as to simultaneously pass through spaced portions of said coil, and means for periodically connecting said coil with said battery, said coil being mounted for oscillation through said magnetic field.]

[4. In a battery operated electric watch, a balance wheel and staff assembly, a coil carried by said assembly eccentrically of said staff, means establishing a magnetic field having two intensified regions arranged to simultaneously intersect spaced portions of said coil, and means for periodically connecting said coil with said battery to cause impulsing of said spaced portions of said coil in the same rotational direction.]

5. In an electric watch, permanent magnet means, a pair of intensified magnetic fields created by said magnet means, an oscillating balance wheel, a single coil carried by such wheel and having portions substantially radial to said wheel, the plane of rotation of said wheel being substantially normal to the flux of the intensified magnetic fields, said fields being located within the circumference of said wheel, means for energizing said coil simultaneously with its passage through said fields, whereby the interaction of said fields with the magnetic flux of said coil will produce the net torque on said balance wheel.

6. An electric watch as set out in claim 5 wherein said wheel is carried by a balance staff, a roller carried above the wheel, a second roller carried below the wheel, the upper roller supporting a jewel pin and an electrical contact, and the lower roller supporting an indexing pin.

[7. In a battery operated electric watch, a balance staff, a substantially planar coil carried by said staff, the plane of said coil being perpendicular to said staff, means establishing a magnetic field having two intensified regions centered at positions spaced about said staff less than 180° apart, said coil having spaced portions simultaneously positionable in said intensified regions, and means for periodically connecting said coil with said battery, said coil being mounted for oscillation through said magnetic field so that said spaced coil portions receive simultaneous impulses from said intensified regions.]

[8. An electric watch as set out in claim 7 wherein said balance staff carries a balance wheel and forms therewith a balance wheel and staff assembly comprising a framework having a hub, said coil being positioned by said framework, a roller carried above the wheel, a second roller carried below the wheel, the upper roller supporting a jewel pin and an electrical contact and the lower roller supporting an indexing pin.]

[9. An electric watch as set out in claim 8 wherein said coil has a thickness in the direction of the axis of said staff substantially no greater than the thickness of said framework in the same direction.]

[10. An electric watch as set out in claim 7 wherein said balance staff carries a balance wheel and forms therewith a balance wheel and staff assembly comprising a framework having a hub, said coil being carried by said framework and having a thickness in the direction of the axis of said staff substantially no greater than the thickness of said framework in the same direction.]

[11. An electric watch as set out in claim 10 wherein said coil comprises a pair of straight sides joined by arcuate coil portions.]

[12. In a battery operated electric watch, a balance staff, a coil wound about an axis parallel to said staff, means establishing a magnetic field have two intensified regions arranged to simultaneously pass through spaced portions of said coil, and means for periodically connecting said coil with said battery, said coil being mounted for oscillation through said magnetic field.]

[13. A watch as set out in claim 12 wherein said balance staff carries a balance wheel and forms therewith a balance wheel and staff assembly comprising a framework having a hub, said coil being positioned by said framework, a roller carried above the wheel, a second roller carried below the wheel, the upper roller supporting a jewel pin and an electrical contact and the lower roller supporting an indexing pin.]

[14. In a miniature battery operated isochronal device, a balance staff mounted for oscillation, a substantially planar coil carried by said staff with the plane of said coil perpendicular to said staff, means establishing a magnetic field having two intensified regions spaced about said staff such a distance that spaced portions of said coil are simultaneously positionable within said intensified regions, and means for periodically connecting said coil with said battery to provide simultaneous impulses to said spaced portions of said coil.]

[15. A device as set out in claim 14 wherein the magnetic axes of said intensified regions are substantially parallel to said staff.]

[16. A device as set out in claim 15 wherein said intensified regions are spaced about said staff by an angle of less than 180°.]

17. A device as set out in claim 16 wherein said coil comprises a sector shaped coil mounted eccentrically of said staff and having radial portions thereof forming said spaced portions.

18. A device as set out in claim 14 wherein said balance staff carries a balance wheel and forms therewith a balance wheel and staff assembly comprising a framework having a hub, said coil being positioned by said framework, a roller carried above the wheel, a second roller carried below the wheel, the upper roller supporting a jewel pin and an electrical contact and the lower roller supporting an indexing pin.

[19. A device as set out in claim 18 wherein said coil has a thickness in the direction of the axis of said staff substantially no greater than the thickness of said framework in the same direction.]

[20. A device as set out in claim 14 wherein said balance staff carries a balance wheel and forms therewith a balance wheel and staff assembly comprising a framework having a hub, said coil being carried by said framework and having a thickness in the direction of the axis of said staff substantially no greater than the thickness of said framework in the same direction.]

[21. A device as set out in claim 20 wherein said coil comprises a pair of straight sides joined by arcuate coil portions.]

*22. In an electric watch, permanent magnet means, a pair of intensified magnetic fields created by said magnet means, an oscillating balance wheel, a single coil carried by such wheel and having portions substantially radial to said wheel, the plane of rotation of said wheel being substantially normal to the flux of the intensified magnetic fields, said fields being located within the circumference of said wheel, means for energizing said coil simultaneously with its passage through said fields, whereby the interaction of said fields with the magnetic flux of said coil will produce the net torque on said balance wheel, said single coil being eccentrically mounted on the balance wheel with the portions substantially radial to said wheel constituting two active coil sides disposed substantially parallel to the plane of rotation of said wheel and spaced from one other by less than 180° about the rotational axis of the wheel, said fields having magnetic axes substantially parallel to the rotational axis of the balance wheel and spaced apart from one another a distance equal to the spacing between said active coil sides whereby during rotation of said balance wheel said active coil sides are simultaneously disposed in said intensified magnetic fields, said permanent magnet means comprising permanent magnets stationarily arranged on one side of said balance wheel with portions adjacent the path of movement of said coil, an elongated magnetic shunt member stationarily mounted on the other side of said balance wheel adjacent the path of movement of said coil, said magnets each having first and second poles but being so arranged that only said first poles lie adjacent the path of movement of said coil, said first poles cooperating with said magnetic shunt member to establish said intensified magnetic fields and being of unlike polarity whereby magnetic flux passes out of one of said first poles through said magnetic shunt and into another of said first poles of said permanent magnet means, each of said magnets extending from said first poles away from the path of movement of said coil whereby residual flux in said magnets is led to said second poles away from the area of said balance wheel, said shunt member being closest to said magnets at the position of said first poles to form said intensified fields in air gaps adjacent each of said first poles lying in the path of movement of said coil, and being more distantly spaced from the second poles of said magnets, said coil being periodically energized from a battery in said watch by contact means operated by the swinging movement of the balance wheel so that the two active coil sides are simultaneously in said intensified magnetic fields at moments of energization.*

*23. An electric watch as set out in claim 22 including a hairspring spaced from said balance wheel, said magnetic shunt being positioned between said balance wheel and said hairspring.*

*24. An electric watch as set out in claim 23 including roller means and an insulating sleeve rotatable with said balance wheel, a jewel pin carried by said roller means, an electrical contact associated with said jewel pin for closing the circuit to said coil, said contact being electrically isolated from said balance wheel by said insulating sleeve, and indexing means for coupling said roller means to the train of said watch.*

References Cited by the Examiner

The following references, cited by the Examiner, are of record in the patented file of this patent or the original patent.

(Other references on following page)

UNITED STATES PATENTS

| | | | |
|---|---|---|---|
| 1,175,610 | 3/1916 | Cove | 58—28 |
| 2,125,638 | 8/1938 | Hubert | 58—28 |
| 2,577,703 | 12/1951 | Fillinger | 58—28 |
| 2,598,912 | 6/1952 | Held | 58—28 |
| 2,644,293 | 7/1953 | Black | 58—28 |
| 2,662,366 | 12/1953 | Koehler | 58—28 |

FOREIGN PATENTS 501,215 1/1920 France.

RICHARD B. WILKINSON, *Primary Examiner.*

E. L. MORSE, J. P. STRIZAK, *Examiners.*